(12) United States Patent
Otsubo et al.

(10) Patent No.: US 7,731,238 B2
(45) Date of Patent: Jun. 8, 2010

(54) STRADDLE-TYPE VEHICLE

(75) Inventors: Yasuyuki Otsubo, Shizuoka (JP); Yasuo Okamoto, Shizuoka (JP)

(73) Assignee: Yamaha Hatsudoki Kabushiki Kaisha, Shizuoka (JP)

( * ) Notice: Subject to any disclaimer, the term of this patent is extended or adjusted under 35 U.S.C. 154(b) by 250 days.

(21) Appl. No.: 11/961,083

(22) Filed: Dec. 20, 2007

(65) Prior Publication Data

US 2008/0156558 A1    Jul. 3, 2008

(30) Foreign Application Priority Data

Dec. 28, 2006    (JP)    .............................. 2006-356599

(51) Int. Cl.
*B65D 90/00*    (2006.01)
(52) U.S. Cl. ...................... 280/835; 280/830; 280/833; 280/834; 220/4.14; 220/562
(58) Field of Classification Search ................. 280/835, 280/834, 830, 833; 220/562, 4.14
See application file for complete search history.

(56) References Cited

U.S. PATENT DOCUMENTS

| 4,305,416 | A  * | 12/1981 | Henning et al. | ................ | 137/38 |
| 2006/0102626 | A1 * | 5/2006 | Mitsch et al. | ............... | 220/4.12 |
| 2007/0075087 | A1 * | 4/2007 | Knight | ........................ | 220/562 |
| 2007/0089922 | A1 * | 4/2007 | Iwasaki | ...................... | 180/219 |
| 2008/0011743 | A1 * | 1/2008 | Edwards | .................... | 220/4.14 |

FOREIGN PATENT DOCUMENTS

JP    2003-054468    2/2003

\* cited by examiner

*Primary Examiner*—Lesley Morris
*Assistant Examiner*—Michael R Stabley
(74) *Attorney, Agent, or Firm*—Keating & Bennett, LLP

(57) ABSTRACT

A straddle-type vehicle that reliably leads fuel that overflows from a fuel fill opening away to a safe area without specialist components. A fuel tank includes a recess portion that is formed around a fuel fill opening, and a raised section that is formed to the outer side of the recess portion and that is at a higher position than the recess portion.

10 Claims, 8 Drawing Sheets

STRADDLE-TYPE VEHICLE

RELATED APPLICATIONS

This application claims the benefit of priority under 35 USC 119 of Japanese patent application no. 2006-356599, filed on Dec. 28, 2006, which application is hereby incorporated by reference in its entirety.

BACKGROUND OF THE INVENTION

1. Field of the Invention

The invention relates to a fuel tank for a straddle-type vehicle that reliably leads fuel that has overflowed from a fuel fill opening to a safe area.

2. Description of Related Art

In a straddle-type vehicle, such as a scooter or under bone motorcycle or the like, a fuel tank that supplies fuel to an engine may be provided above a rear wheel. A fuel fill opening cover with a bowl like shape may be provided around the fuel fill opening to catch fuel that has overflowed and to prevent the fuel from flowing to high temperature areas such as the engine (see, for example, JP-A-2003-54468, pages 3-4, FIGS. 2-4). Furthermore, a drain hose that extends as far as an intermediate section between the front wheel and the rear wheel may be fitted to a drain hole formed in the fuel fill opening cover.

However, this structure has a drawback in that specialist components such as the fuel fill opening cover and the drain hose increase the manufacturing cost of the vehicle.

SUMMARY OF THE INVENTION

The invention has been devised in light of these circumstances and provides a straddle-type vehicle that reliably leads fuel that overflows from a fuel fill opening to a safe area without use of specialist components.

One aspect of the invention is a straddle-type vehicle comprising an engine that generates driving force and a fuel tank that stores fuel that is supplied to the engine. A fuel fill opening is formed in an upper surface of the fuel tank. The fuel tank includes a recess portion formed around the fuel fill opening, and a raised section formed on an outer side of the recess portion at a position higher than the recess portion.

According to the invention, the recess portion formed in the fuel tank around the fuel fill opening catches fuel that overflows from the fuel fill opening. As a result, fuel that overflows from the fuel fill opening is reliably inhibited from flowing to areas that reach high temperatures such as the engine.

In addition, specialist components are not necessary to reliably inhibit fuel that overflows from the fuel fill opening from flowing to areas that reach high temperatures. Thus, manufacturing cost of the vehicle is reduced.

In one embodiment, the recess portion is formed by a bottom surface section and a side wall section that extends upward from the bottom surface section. An opening section that opens in a determined direction, where the side wall section is not provided, is formed in the recess portion. The bottom surface section inclines in the determined direction.

In one embodiment, the bottom surface section inclines toward the outside in a vehicle width direction.

In another embodiment, a sound absorber is connected to the engine is provided. The bottom surface section inclines toward a side opposite to a side where the sound absorber is provided.

In another embodiment, a side stand supports the vehicle such that it inclines to a side. The bottom surface section inclines toward the side where the side stand is provided.

In a further embodiment, the side wall section inclines in a direction away from the fuel fill opening.

A second aspect of the invention is a straddle-type vehicle comprising a wheel, an engine that generates driving force and a fuel tank that stores fuel that is supplied to the engine. A fuel fill opening is formed in the fuel tank, and a fender is disposed beneath the fuel tank and to the outside in the diameter direction of the vehicle wheel. The fender includes a gutter member that catches fuel that overflows outward from the periphery of the fuel fill opening, and that leads the caught fuel downward in a determined direction.

According to the invention, the gutter member formed in the fender catches fuel that overflows from the periphery of the fuel fill opening and leads the caught fuel downward in the determined direction. Thus, the gutter member catches fuel that overflows from the fuel fill opening and reliably inhibits fuel that overflows from the fuel fill opening from flowing to areas that reach high temperatures like the engine.

In addition, specialist components are not needed to reliably inhibit fuel that overflows from the fuel fill opening from flowing to high temperature areas. Thus, manufacturing costs of the straddle-type vehicle are reduced.

In one embodiment, the gutter member inclines in the determined direction.

In another embodiment, a body cover covers sides of the vehicle. The body cover has a front-rear direction guide plate that protrudes toward the inside in the vehicle width direction. The front-rear direction guide plate is provided above the gutter member, and is aligned with a downward flow direction of the fuel that flows down along the gutter member.

In another embodiment, the body cover includes an upward-downward direction guide plate that protrudes toward the inside in the vehicle width direction. The upward-downward direction guide plate is provided to the front of the gutter member, and extends in the upward-downward direction of the vehicle.

In a further embodiment, the upward-downward direction guide plate is positioned to the rear of the engine.

The invention accordingly provides a straddle-type vehicle that reliably leads fuel that overflows from a fuel fill opening away to a safe area without the necessity of specialist components.

Other features and advantages of the invention will be apparent from the following detailed description, taken in conjunction with the accompanying drawings which illustrate, by way of example, various features of embodiments of the invention.

DETAILED DESCRIPTION OF THE INVENTION

Figure 1:
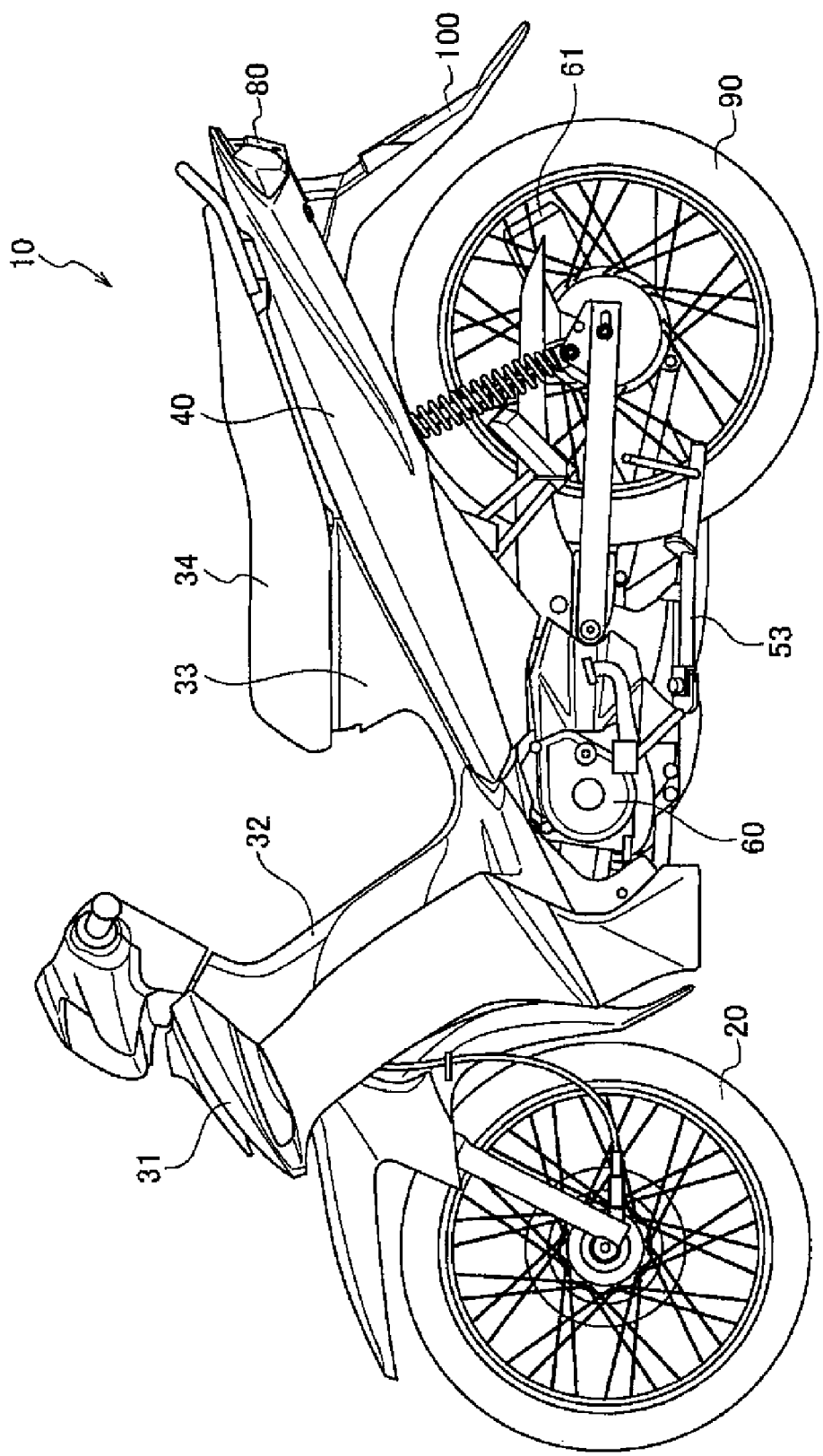
FIG. 1 is a left side view of a motorcycle according to an embodiment of the invention.

An embodiment of a straddle-type vehicle according to the invention is now described with reference to the drawings. In the drawings, structural members that are the same or similar are denoted with the same or similar reference numerals. The drawings are schematic, and thus the relative scale of dimensions and the like may be different from the real object. Specific dimensions and the like can be determined based on reference to the following description. In addition, the relationship and scale of dimensions and the like may vary from figure to figure.

(Structure of the Straddle-Type Vehicle)

Figure 2:
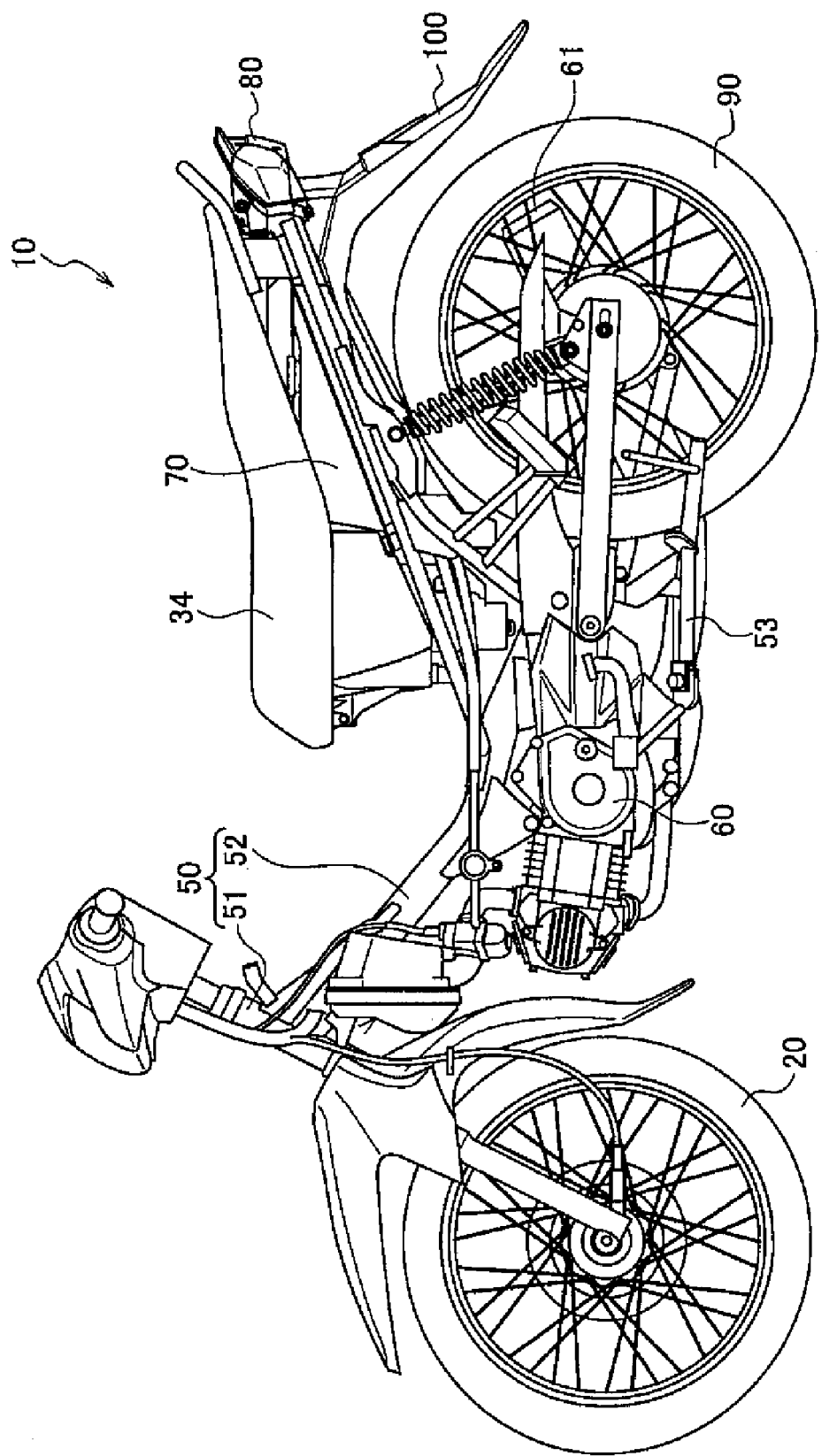
FIG. 2 is a left side view of the motorcycle with vehicle body covers removed.

FIG. 1 is a left side view of a motorcycle 10 which is a straddle-type vehicle according to an embodiment of the invention. FIG. 2 is a left side view of motorcycle 10 when vehicle body covers have been removed. Motorcycle 10 is an underbone motorcycle with a body frame 50 that is disposed further downward as compared to a standard saddle-type motorcycle. Motorcycle 10 has a front wheel 20 and a rear wheel 90 driven by driving force generated by an engine 60.

Body frame 50 includes a steering head pipe 51 and a down tube 52 that extends downward from steering head pipe 51. Body frame 50 is covered by a plurality of vehicle body covers including a body cowl 31, a leg shield 32, an under seat cover 33, and a side cover 40.

Body cowl 31 is disposed in front of steering head pipe 51 and is attached to leg shield 32 disposed in front of the legs of a rider who sits on a seat 34. Under seat cover 33 is disposed beneath seat 34. Side cover 40 is disposed on and covers a left side section of body frame 50. A side cover (not shown in the figures) that has a shape that is generally symmetrical with that of side cover 40 is disposed on a right side section of body frame 50.

A fuel tank 70 that stores fuel that is supplied to engine 60 is disposed above rear wheel 90. A muffler 61 (a sound absorber) is provided to the right side of rear wheel 90, and connects to engine 60. A side stand 53 provided to the rear of engine 60 and fixed to the left side of body frame 50 supports motorcycle 10 such that motorcycle 10 inclines to the left side.

A rear fender 100 is provided between fuel tank 70 and rear wheel 90, and to the outer side in the radial direction of rear wheel 90. Rear fender 100 inhibits rain water or the like from being thrown up by rear wheel 90. A tail lamp unit 80 is disposed above rear fender 100.

(Shape of the Fuel Tank)

Figure 3:
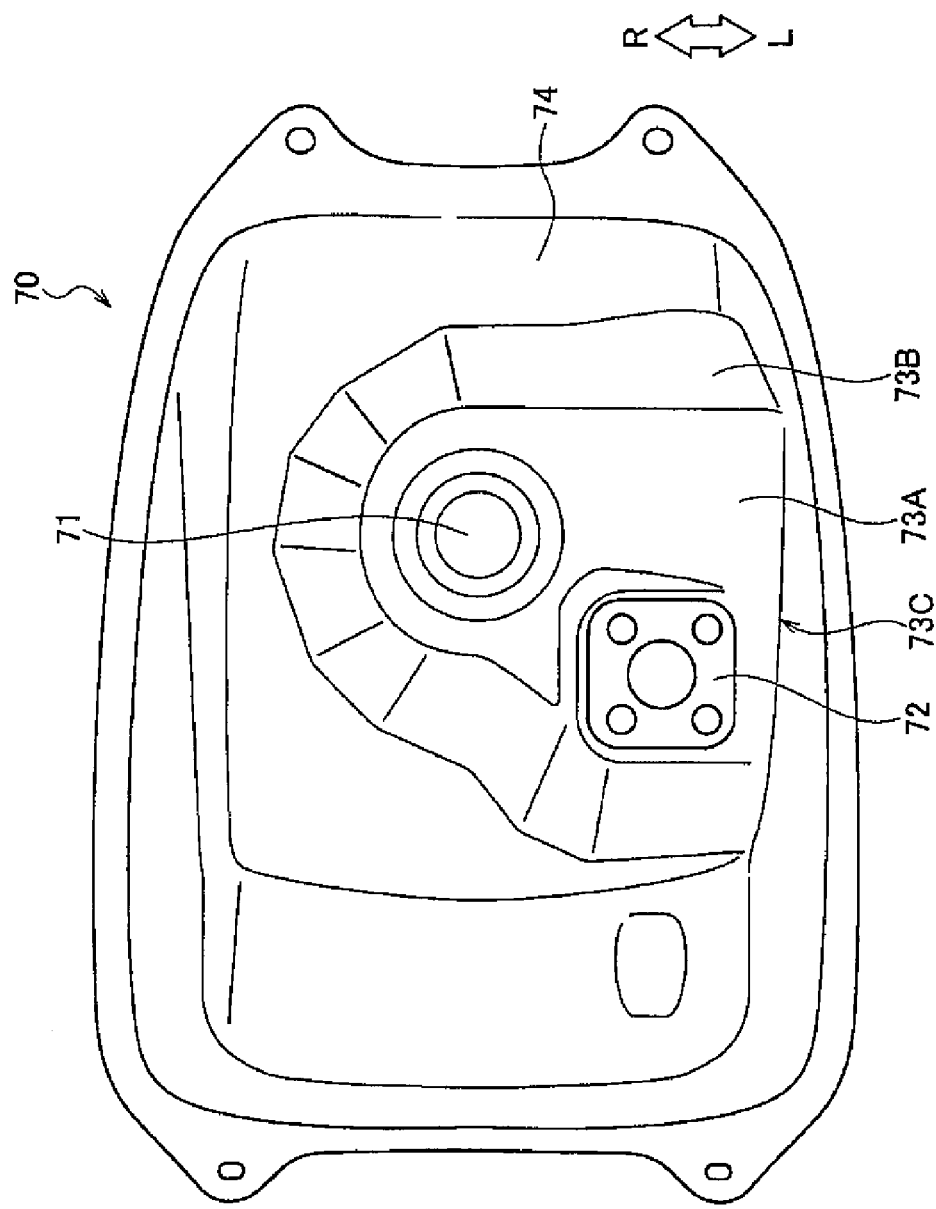
FIG. 3 is a plan view of a fuel tank according to an embodiment of the invention.
Figure 4:
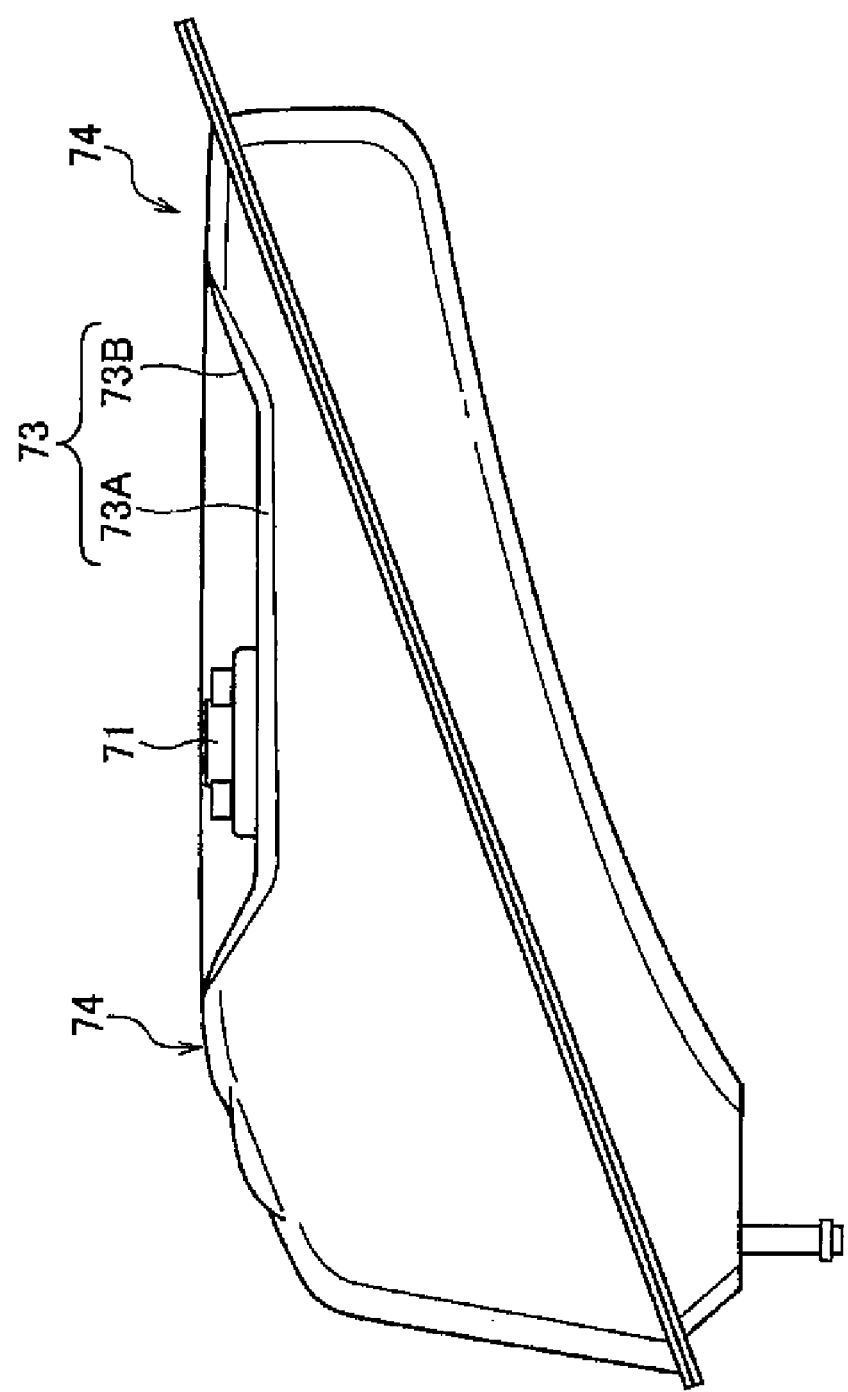
FIG. 4 is a left side view of the fuel tank.

The shape of fuel tank 70 is now explained. FIG. 3 is a plan view of fuel tank 70 and FIG. 4 is a left side view of fuel tank 70. As can be seen from FIGS. 3 and 4, a fuel fill opening 71 is formed in an upper surface of fuel tank 70. A fuel meter 72 that detects the amount of fuel stored in fuel tank 70 is attached to the upper surface of fuel tank 70.

A recess portion 73 that can trap fuel that overflows from fuel fill opening 71 is formed around fuel fill opening 71. Recess portion 73 is formed by a bottom surface section 73A and a side wall section 73B. An opening section 73C that opens toward the direction of the left side (a determined direction) of motorcycle 10, where side wall section 73B is not provided, is formed in recess portion 73.

Bottom surface section 73A inclines toward the outside in the vehicle width direction of motorcycle 10, in particular, in the direction of the left side (the determined direction) of motorcycle 10. More particularly, bottom surface section 73A inclines toward the side opposite to the right side of motorcycle 10 where muffler 61 is provided (FIGS. 1 and 2). Furthermore, as described above, side stand 53 is fixed to the left side of body frame 50. Thus, bottom surface section 73A is inclined toward the side of motorcycle 10 provided with side stand 53.

Side wall section 73B extends diagonally upward from bottom surface section 73A, and inclines in a direction away from fuel fill opening 71. A raised section 74 is formed by the upper surface of fuel tank 70 around recess portion 73. Raised section 74 is formed at the outer side of recess portion 73, and is at a higher level than recess portion 73.

(Shape of the Fender)

Figure 5:
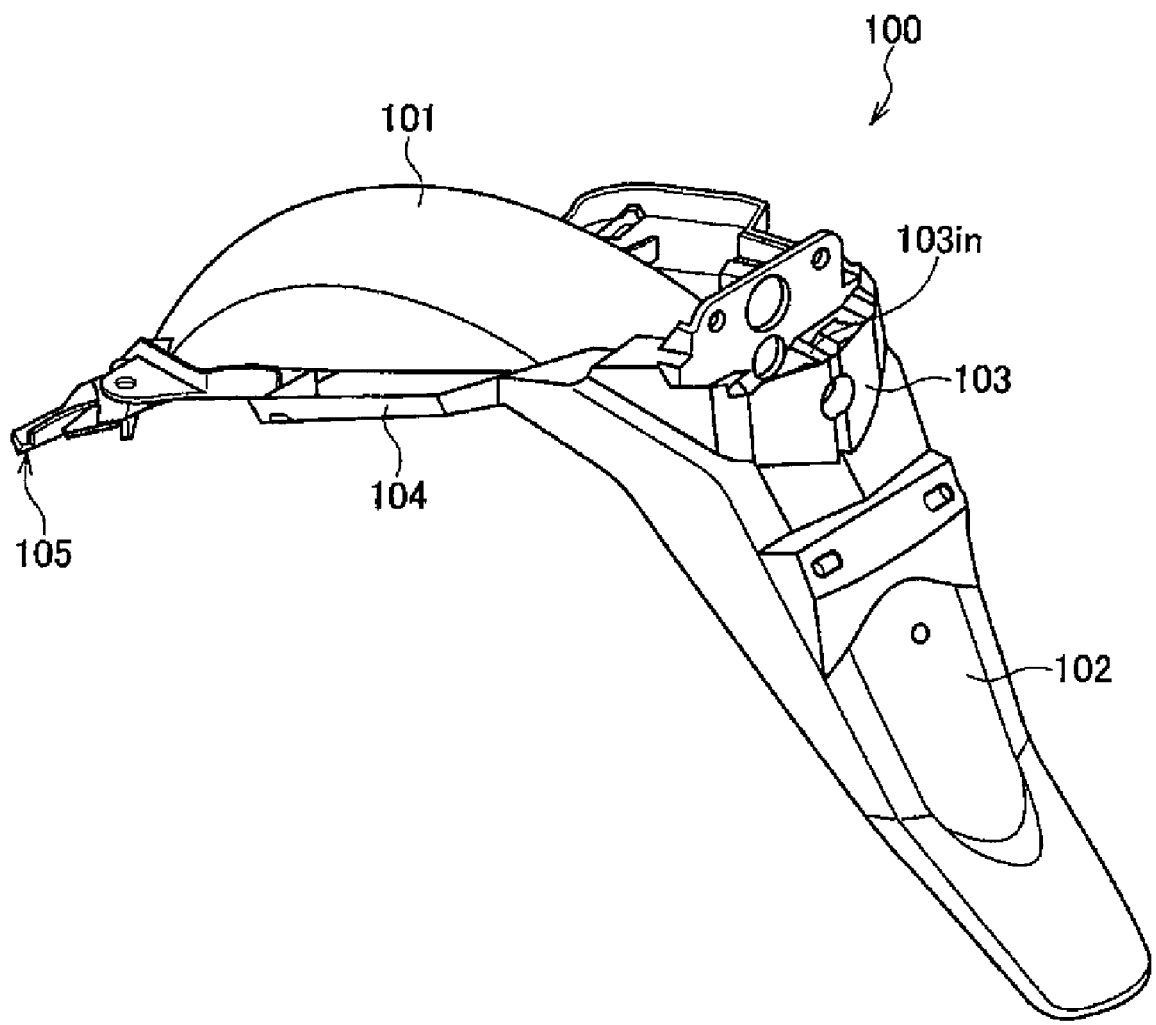
FIG. 5 is a rear perspective view of a fender according to an embodiment of the invention.
Figure 6:
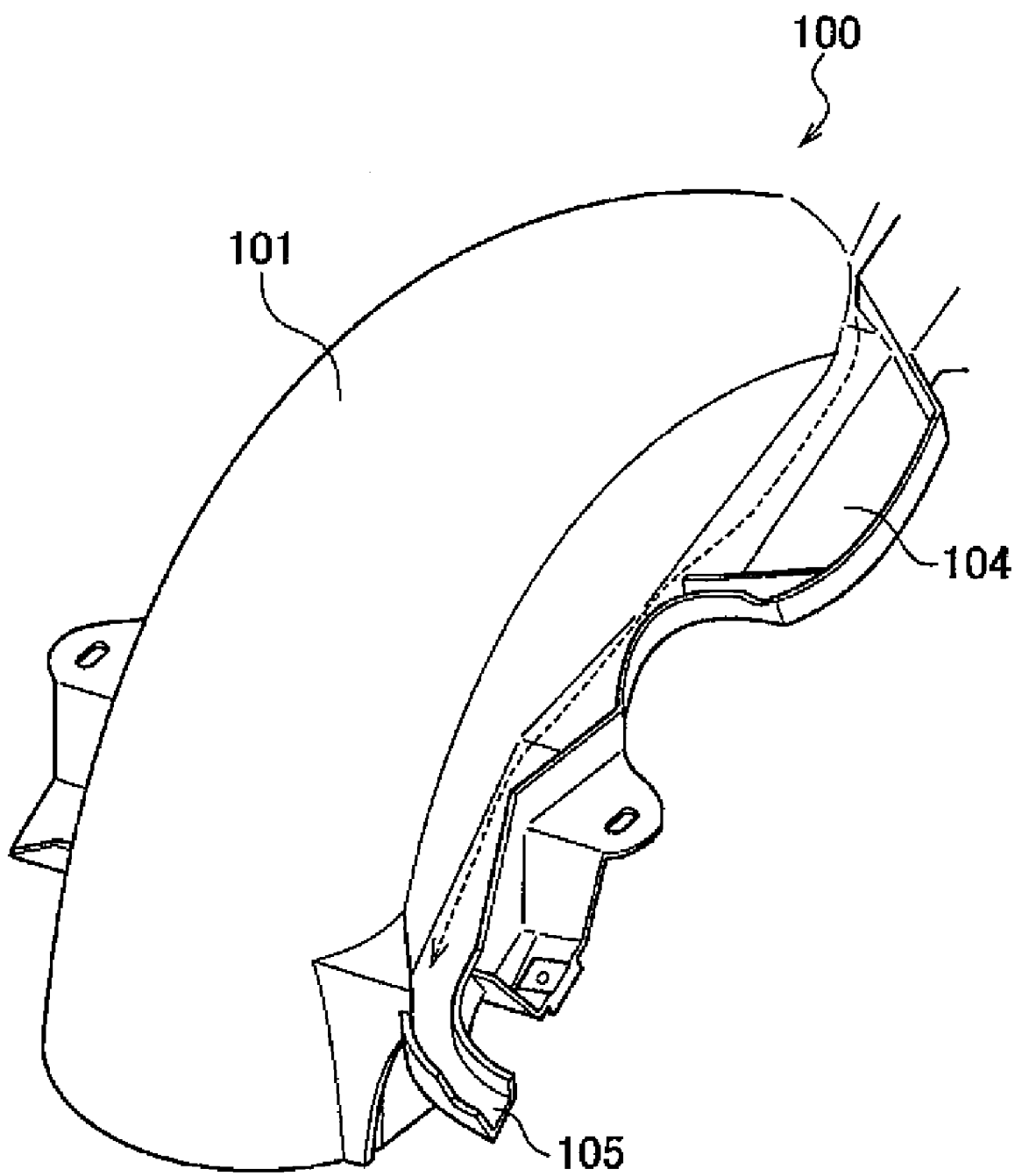
FIG. 6 is a front perspective view of the fender.

The shape of rear fender 100 is now explained. FIG. 5 is a perspective view of rear fender 100 from the rear. FIG. 6 is a perspective view of rear fender 100 from the front. As can be seen from FIGS. 5 and 6, rear fender 100 includes an upper side fender member 101 and a rear side fender member 102. Upper side fender member 101 has generally an arc shape and is positioned above rear wheel 90. Rear side fender member 102 is positioned to the rear of rear wheel 90.

Rear fender 100 also includes an extending member 103 that extends upward from rear side fender member 102, and a gutter member 104 that is formed at the left side of upper side fender member 101. In one embodiment, rear fender 100 is made of polypropylene, and upper side fender member 101, rear side fender member 102, extending member 103 and gutter member 104 are formed as an integrated unit.

Gutter member 104 catches fuel that flows out from the periphery of fuel fill opening 71, namely, from opening section 73C of recess portion 73. Gutter member 104 inclines toward the front (a determined direction), and leads caught fuel toward the front (refer to the dotted line in FIG. 6). Gutter member 104 communicates with an inside region 103 in of extending member 103 and leads rain water or the like that has entered inside region 103 in to the front of motorcycle 10.

A discharge port 105 is formed at a front end of gutter member 104. Discharge port 105 downwardly discharges liquid such as rain water that has entered from inside region 103 in, and fuel that has overflowed from fuel tank 70. Discharge port 105 is positioned between engine 60 and rear wheel 90.

(Shape and Arrangement of the Vehicle Body Cover)

Figure 7:
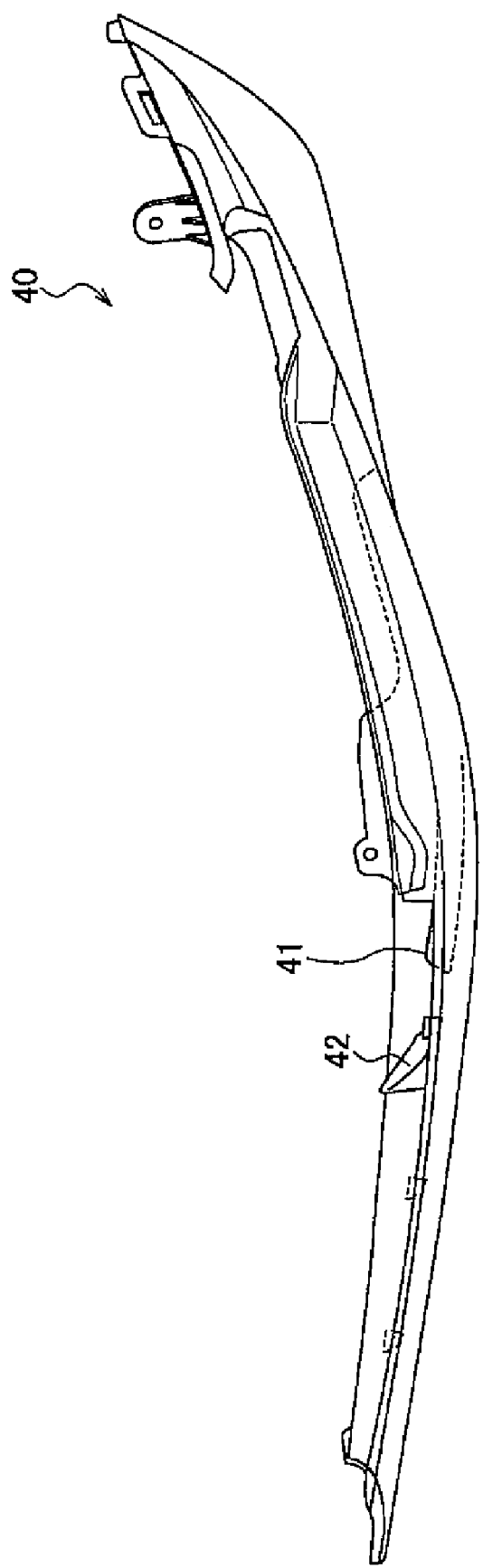
FIG. 7 is a plan view of a vehicle body cover according to an embodiment of the invention.
Figure 8:
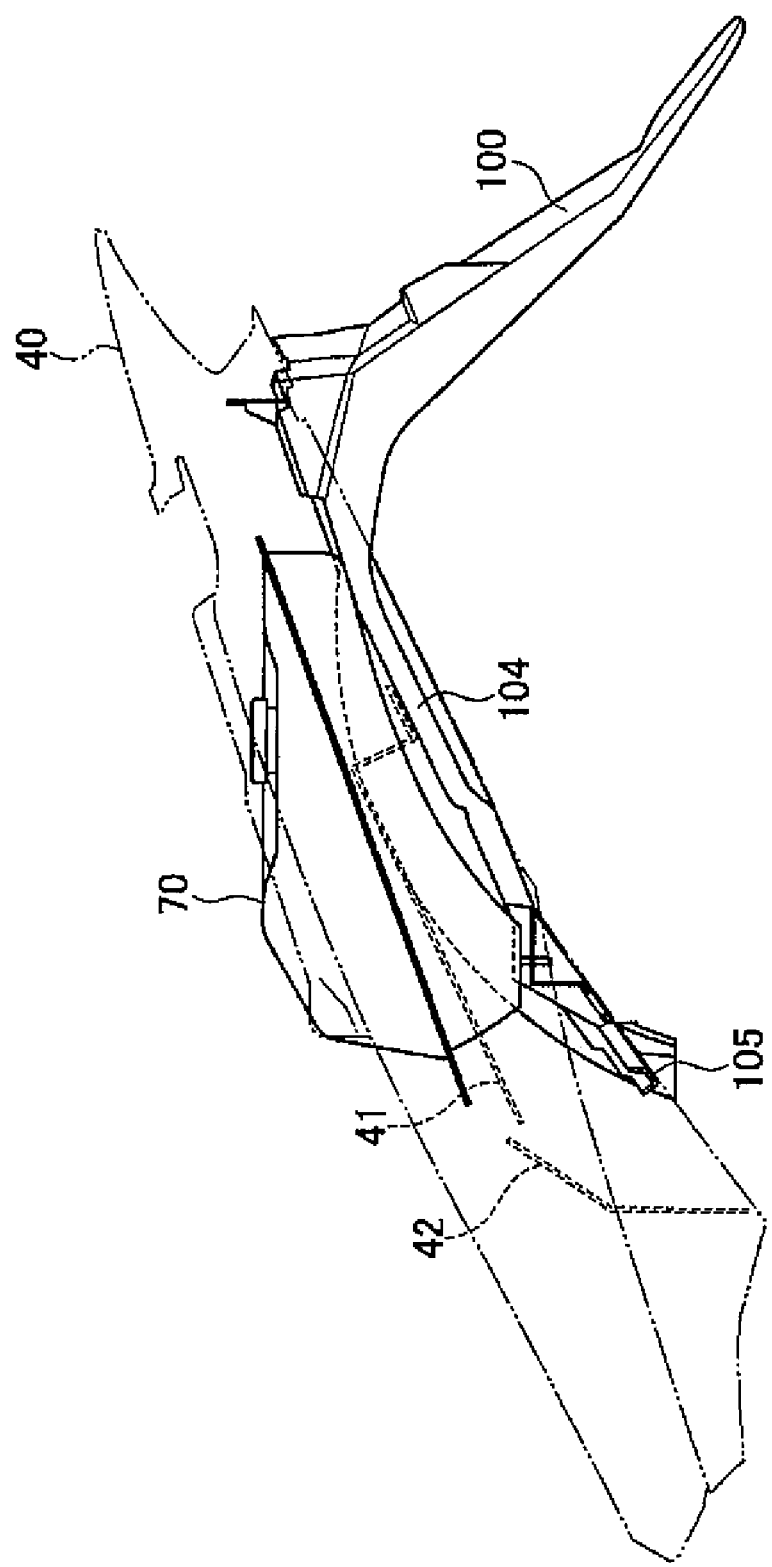
FIG. 8 is a left side view of a general outline of the arrangement of the vehicle body cover, the fuel tank, and the fender.

The shape and arrangement of the body cover, and more particularly side cover 40, is now explained. FIG. 7 is a plan view of side cover 40. FIG. 8 is a left side view of the general outline of the arrangement of side cover 40, fuel tank 70 and rear fender 100.

As shown in FIGS. 7 and 8, a horizontal rib 41 that protrudes toward the inside in the vehicle width direction and a vertical rib 42 are formed in side cover 40. In this embodiment, horizontal rib 41 forms a front-rear direction guide plate. Vertical rib 42 forms an upward-downward direction guide plate. Horizontal rib 41 is disposed above gutter member 104 and is in alignment with the downward flow direction of fuel that flows down the inside of gutter member 104. In other words, horizontal rib 41 is inclined toward the front of motorcycle 10. Vertical rib 42 extends in the upward-downward direction of motorcycle 10 at a position forward of gutter member 104 and to the rear of engine 60.

More particularly, fuel that overflows from fuel fill opening 71 of fuel tank 70 flows downward in the direction toward the left side (the determined direction) of motorcycle 10. Fuel that has flowed down in the direction toward the left side of motorcycle 10 will either flow downward toward the front as a result of horizontal rib 41, or flow downward still further and be captured by gutter member 104.

Fuel caught by gutter member 104 flows downward toward the front and is discharged by discharge port 105. Vertical rib 42 is positioned forward of discharge port 105, and thus fuel discharged by discharge port 105 is inhibited from flowing forward of vertical rib 42.

(Operation & Advantages)

In motorcycle 10, recess portion 73 formed in fuel tank 70 around fuel fill opening 71 catches fuel that overflows from fuel fill opening 71. In addition, gutter member 104 formed in rear fender 100 catches fuel that has flowed out from the periphery of fuel fill opening 71, and leads caught fuel downward in the direction of the left side of motorcycle 10. Thus, gutter member 104 catches fuel that has overflowed from fuel fill opening 71.

As a result, fuel that overflows from fuel fill opening 71 due to over filling of fuel into fuel fill opening 71 is reliably inhibited from flowing to areas that reach high temperatures such as engine 60, muffler 61 and the like. Specialist components are thereby not necessary to reliably inhibit fuel that overflows from fuel fill opening 71 from flowing to high temperature areas. Thus, the manufacturing cost of motorcycle 10 is reduced.

In this embodiment, recess portion 73 of fuel tank 70 inclines in the direction toward the left side of motorcycle 10. Accordingly, fuel that overflows from fuel fill opening 71 is reliably inhibited from flowing to muffler 61 that is provided on the right side of motorcycle 10. In addition, side stand 53 is fixed to the left side of body frame 50. When side stand 53 is being used, motorcycle 10 is supported such that it leans to the left side, and thus fuel that is caught by recess portion 73 can be quickly discharged to the outside.

In this embodiment, side wall section 73B formed in recess portion 73 inclines in the direction away from fuel fill opening 71. As a result, the amount of fuel that can be held in recess portion 73 is increased without increasing the surface area of bottom surface section 73A. Furthermore, because the angle formed by bottom surface section 73A and side wall section 73B and the angle formed by side wall section 73B and raised section 74 are increased, the processing of fuel tank 70 is easier to perform.

In this embodiment, horizontal rib 41 that protrudes inward in the vehicle width direction extends in alignment with gutter member 104. Thus, fuel that overflows from fuel fill opening 71 is led downward to gutter member 104 or to the front more reliably.

Moreover, vertical rib 42 is formed in side cover 40 to the front of gutter member 104, and extends in the upward-downward direction of motorcycle 10. As a result, fuel that is discharged from discharge port 105 is inhibited from flowing forward of vertical rib 42.

OTHER EMBODIMENTS

One embodiment of the invention has been described to disclose the features of the invention. However, the invention is not limited by the description and the drawings that constitute one section of the disclosure. Various modified forms of the invention will be apparent to those of skill in the art.

For example, while horizontal rib 41 and vertical rib 42 have been described as being formed in side cover 40, horizontal rib 41 and vertical rib 42 do not necessarily have to be provided.

In addition, while bottom surface section 73A of recess portion 73 has been described as inclining in a direction toward the left side of motorcycle 10, bottom surface section 73A does not necessarily have to incline.

As is apparent, the invention includes various modified embodiments not described herein. Accordingly, the scope of the invention is defined by the features set forth in the following claims.

The invention claimed is:

1. A straddle-type vehicle comprising:
   an engine arranged to generate a driving force; and
   a fuel tank arranged to store fuel that is supplied to the engine, wherein a fuel fill opening is formed in an upper surface of the fuel tank, and the fuel tank comprises:
   a recess portion located directly adjacent to a periphery of the fuel fill opening and arranged to surround the fuel fill opening such that the fuel fill opening is located within the recess portion; and
   a raised section located on an outer side of the recess portion at a position higher than the recess portion; wherein
   the recess portion includes a bottom surface section and a side wall section arranged to extend upwards from the bottom surface section;
   an opening section is provided in the side wall section and arranged to open in a determined direction; and
   the bottom surface section inclines in the determined direction towards the opening section.

2. The straddle-type vehicle according to claim 1, wherein the bottom surface section inclines toward the outside in a vehicle width direction.

3. The straddle-type vehicle according to claim 1, comprising:
   a sound absorber that is connected to the engine, wherein the bottom surface section inclines toward a side opposite to a side where the sound absorber is provided.

4. The straddle-type vehicle according to claim 1, comprising:
   a side stand arranged to support the straddle-type vehicle such that the straddle-type vehicle inclines to a side, wherein
   the bottom surface section inclines toward the side where the side stand is provided.

5. The straddle-type vehicle according to claim 1, wherein the side wall section inclines in a direction away from the fuel fill opening.

6. A straddle-type vehicle comprising:
   a wheel;
   an engine that generates driving force;
   a fuel tank that stores fuel that is supplied to the engine, and in which a fuel fill opening is formed; and
   a fender that is disposed beneath the fuel tank and to the outside in the diameter direction of the vehicle wheel, wherein
   the fender includes a gutter member that catches fuel that overflows outward from the periphery of the fuel fill opening, and that leads the caught fuel downward in a determined direction.

7. The straddle-type vehicle according to claim 6, wherein the gutter member inclines in the determined direction.

8. The straddle-type vehicle according to claim 6, including
   a body cover that covers sides of the straddle-type vehicle, wherein
   the body cover has a front-rear direction guide plate that protrudes toward the inside in the vehicle width direction, and
   the front-rear direction guide plate is provided above the gutter member, and is aligned with a downward flow direction of fuel that flows down along the gutter member.

9. The straddle-type vehicle according to claim 6, wherein the body cover includes an upward-downward direction guide plate that protrudes toward the inside in the vehicle width direction, wherein the upward-downward direction guide plate is provided to the front of the gutter member, and extends in the upward-downward direction of the straddle-type vehicle.

10. The straddle-type vehicle according to claim 9, wherein the upward-downward direction guide plate is positioned to the rear of the engine.

* * * * *